United States Patent
Velmurugan

(10) Patent No.: US 8,549,189 B1
(45) Date of Patent: Oct. 1, 2013

(54) FLEXIBLE INPUT/OUTPUT TRANSLATION SYSTEM AND METHOD

(75) Inventor: Senthil S. Velmurugan, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1731 days.

(21) Appl. No.: 10/448,890

(22) Filed: May 30, 2003

(51) Int. Cl.
  *G06F 13/00* (2006.01)

(52) U.S. Cl.
  USPC ............ 710/15; 710/5; 710/7; 710/8; 710/19; 710/20; 710/33

(58) Field of Classification Search
  USPC .............................. 710/5, 7, 8, 15, 19, 20, 33
  See application file for complete search history.

(56) References Cited

U.S. PATENT DOCUMENTS

| | | | | |
|---|---|---|---|---|
| 6,697,254 | B1* | 2/2004 | King et al. | 361/687 |
| 2001/0056483 | A1* | 12/2001 | Davis et al. | 709/224 |
| 2002/0093303 | A1* | 7/2002 | Lo | 318/569 |
| 2004/0019834 | A1* | 1/2004 | Chan et al. | 714/47 |

* cited by examiner

*Primary Examiner* — Idriss N Alrobaye
*Assistant Examiner* — Jasjit Vidwan

(57) ABSTRACT

The present invention is a flexible input/output translation system and method that facilitates conservation of chip pin resources while permitting flexible and dynamic changes to processor support operations on the fly. A present invention input/output translator includes a consolidated indication port, translation logic, a plurality of translated indication ports and an initialization port. The consolidated indication port receives a consolidated indication signal (e.g., indicating a desired voltage level) from a general purpose input/output port of a processor. The translation logic translates the consolidated indication signal into a plurality of translated indication signals. The plurality of translated indication ports communicate the plurality of translated indication signals. The initialization port receives an initialization signal. In one exemplary implementation, an synchronization port receives a synchronization signal that controls the operations of the translation logic and determines the timing of an output on the plurality of translated indication ports.

27 Claims, 7 Drawing Sheets

FLEXIBLE INPUT/OUTPUT TRANSLATION SYSTEM AND METHOD

FIELD OF THE INVENTION

The present invention relates to the field of processor operation. More particularly, the present invention relates to a system and method for adjusting graphics processor performance utilizing a minimal number of general purpose input/output (GPIO) pins.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these activities involve significant information processing. Traditionally the processing is performed by processors that include connections or pins for communicating general purpose input and output information associated with support functions. It is often desirable to be able to flexibly adjust a wide variety of support functions. However, flexibly interfacing with a wide variety of functions traditionally requires a significant number of connection pins which consume precious chip resources.

The ability to flexibly adjust a wide variety of functions usually facilitates desired processing characteristics. For example, it is usually desirable to process information rapidly. The amount of information and speed at which it is processed by a processor is determined by a variety of factors. A processor typically performs operations in a sequence of events (e.g., fetching, decoding and executing instructions), the timing of which are largely controlled by a clock signal. However, increasing the clock frequency is often limited by the characteristics of the transistors utilized to perform the processing. Higher voltages are usually used to sustain operations at a higher clock frequency, and higher clock frequencies and voltage supplies cause a processor to consume more power, thereby increasing the temperature of the processor. Continually running a processor at a high temperature stresses the semiconductor device and reduces long term reliability of the device. The ability to flexibly control the frequency, voltage and temperature a processor operates at is desirable.

Traditionally, flexibly interfacing with a variety of different general purpose functions usually requires a significant number of general purpose input/output pins (GPIOs). However, the number of GPIOs available in a typical system is usually limited and traditional attempts at expanding functionality by using passive components increases the complexity of manufacturing operations. The possible granularity and number of choices associated with traditional attempts utilizing passive components in an interface are also usually limited. Some conventional graphics processor unit (GPU) sub systems allocate some GPIOs to a specific support function to maintain BIOS compatibility in a family of boards based on a particular family of GPUs, even if the support function is not necessarily used in the system. For example, a GPIO may be assigned to a dynamic voltage changing support function which may not necessarily be used in all the possible implementations of a GPU system board. However, the GPIOs committed to the dynamic voltage changing support function can not usually be used for other purposes.

Generally, conventional processing systems usually dedicate N general purpose input/output pins to control each level of $2^{(N+1)}$ decoded functional support (e.g., each of multiple voltage supply level). Some traditional systems utilize commutating resistors coupled to less than N general purpose input/output pins to simulate 'N' pins. This usually limits control to less than $2^{(N+1)}$ levels of possible functional support. Utilizing passive commutating resistors in this conventional attempt to control support functions usually increases the complexity of manufacturing operations and still usually involves a significant number of pins to achieve desired flexibility.

FIG. 1 is a block diagram of a prior art general purpose input/output interface implementation. Central processing unit 110 has 4 general purpose input/output ports 111 through 114 controlled by port controllers 121 through 124 (e.g., control registers). The GPIOs 111 through 114 communicate 4 respective voltage level indication signals 141 through 144 to switcher 130. Switcher 130 controls a voltage supply (not shown) output and is capable of providing 32 different levels of control. The conventional general purpose input/output interface implementation requires 4 general purpose input/output pins to control 16 different switcher levels. The signal 145 is used to inform the switcher 130 to start at a single preset voltage level for CPU 110 during power on. Furthermore, even with four general purpose input/output pins, the prior art interface is usually not able to utilize the remaining 16 levels of possible voltage supply control otherwise available with switcher 130.

In addition to being limited in the number of levels a traditional systems can typically control, traditional systems also usually present indefinite timing characteristics which can be problematic. Traditional attempts at control of support operations are usually limited to progressive changes of one port or "level" at a time. For example, traditional attempts usually can not change from a level associated with GPIO port 111 directly to a level associated with GPIO port 114. Traditional control attempts usually involve a sequential change in which the controls (e.g., via port controller 122 and 123) for each intervening GPIO port (e.g., GPIO port 112 and 113) are altered before GPIO port 114. In addition, there is often a latency associated with multi-tasking events when modifying port controllers. A processor may change the values in port controller 121 an then perform other BIOS and/or operating system tasks before each change in a value of port controller 122, 123 and 124. In many cases the latency is indeterministic and slows implementation of desired CPU 110 voltage control level changes by switcher 130.

Greater flexibility in controlling support functions often facilitates the potential for implementation of more complicated functionality schemes. More complicated functionality schemes usually permit greater processing efficiency and optimization. Although it is important to provide for flexible general purpose operations, traditional attempts typically consume precious connections and expend valuable placement resources. Deciding whether to dedicate significant resources for a general purpose support function is usually very hard. It is difficult to predict the applications that will be utilized on a particular system with a great degree of certainty. Thus, conventional designs usually either expend significant chip resources on general purpose pins or leave out the advantageous features.

SUMMARY

The present invention is a flexible input/output translation system and method that facilitates conservation of chip pin resources while permitting flexible and dynamic changes to processor support operations on the fly. In one embodiment, a present invention input/output translator includes a consolidated indication port, translation logic, and a plurality of translated indication ports. The consolidated indication port receives a consolidated indication signal (e.g., indicating a desired voltage level) from a general purpose input/output port of a processor. The translation logic translates the consolidated indication signal into a plurality of translated indication signals. The plurality of translated indication ports communicate the plurality of translated indication signals (e.g., to a controller). In one embodiment, a present invention input/output translation system includes an initialization port for receiving an initialization signal. In one exemplary implementation, a present invention input/output translation system also includes a synchronization port receives a synchronization signal that controls the operations of the translation logic and determines the timing of an output on the plurality of translated indication ports. The present invention is readily implemented for both general, purpose and special function inputs and outputs.

DRAWING DESCRIPTION

The accompanying drawings, which are incorporated in and form a part of this specification, are included for exemplary illustration of the principles of the present and invention and not intended to limit the present invention to the particular implementations illustrated therein. The drawings are not to scale unless otherwise specifically indicated.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a flexible input/output pin translation system and method that facilitates conservation of chip pin resources while permitting flexible and dynamic changes to processor support operations on the fly. For example, a flexible input/output translator permits a minimal number of processor input/output ports to interface with a flexible controller with numerous control levels. In one exemplary implementation, a present invention general purpose input/output translator is utilized to translate instructions for a variety of voltage source control levels. The voltage level can be set at any starting level (e.g., voltage level) for a given processor using an initialization signal (e.g., associated with a pre-set function). The level can move up or down to any level dynamically during operation on the fly and is not limited by the number of available GPIO pins. The processor interacts with a limited number of consolidated indication signals (e.g., including an up down indicator and an clock signal).

Figure 1:
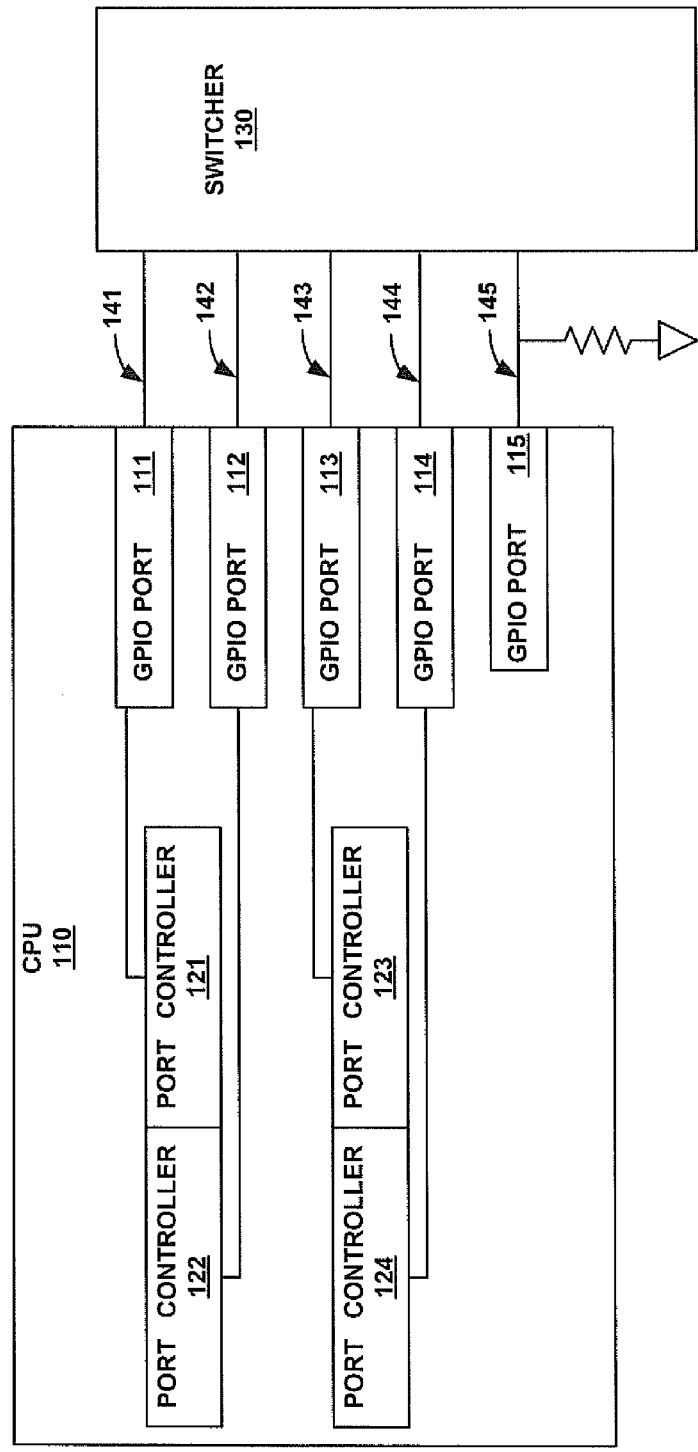
FIG. 1 is a block diagram of a prior art general purpose input/output interface implementation.
Figure 2:
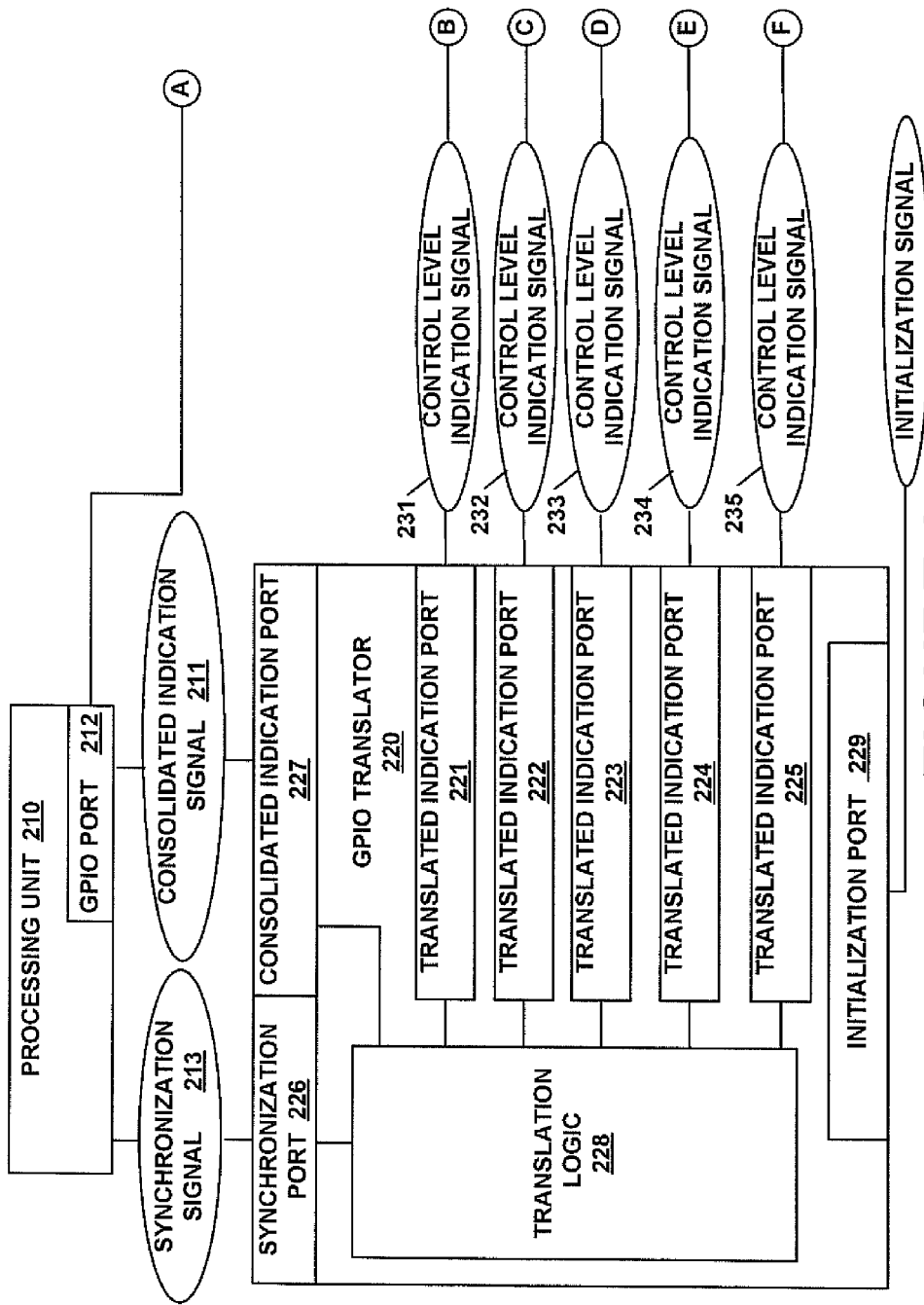
FIG. 2 is a block diagram showing a general purpose input/output translator in accordance with one embodiment of the present invention.
Figure 2:
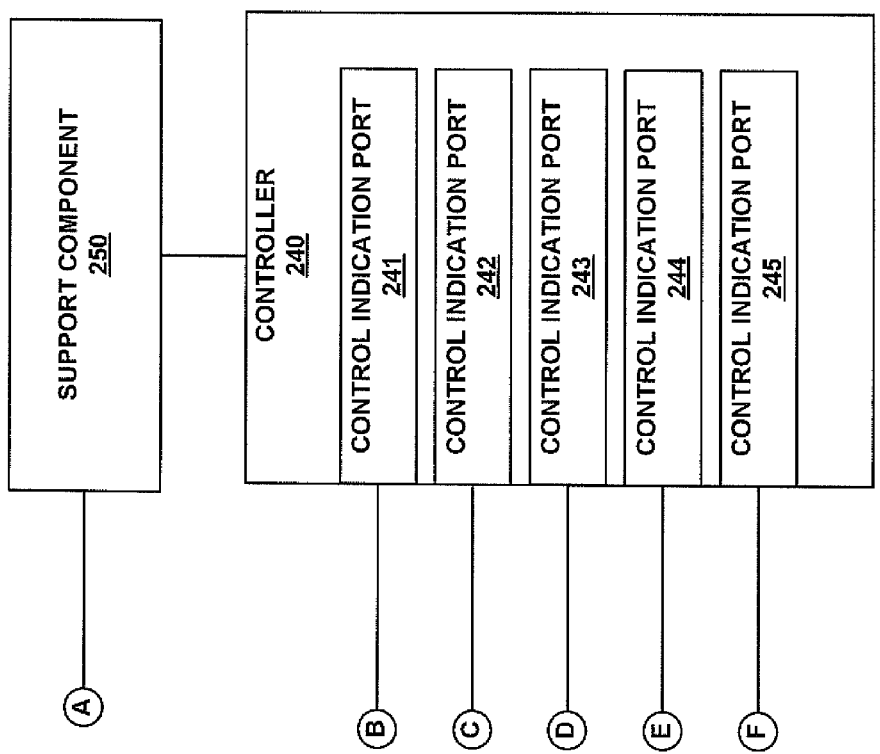

FIG. 2 is a block diagram showing an input/output translator 220, one embodiment of the present invention. In the present embodiment input/output translator 220 is utilized in association with general purpose inputs and outputs. General purpose input/output translator 220 includes consolidated indication port 227, translation logic 228, translated indication ports 221 through 225 and initialization port 229. Translation logic 228 is coupled to consolidated indication port 227, translated indication ports 221 through 225 and initialization port 229. It is appreciated that input/output translator 220 can also be utilized in association with special function inputs and outputs.

The components of general purpose input/output translator 220 cooperatively operated to translate a consolidated indication signal to a plurality of translated indication signals. Consolidated indication port 227 receives consolidated indication signal 211 from processing unit 210 via GPIO port 211. Translation logic 228 translates consolidated indication signal 211 into translated indication signals (e.g., control level indication signals 231 through 235). Translated indication ports 221 through 225 communicate a plurality of translated indication signals (e.g., control level indication signals 231 through 235). Initialization port 229 receives an initialization signal. The initialization port 229 can include a variety of implementations (e.g., a single pin or multiple pins) and can receive initialization signals that convey different initialization values.

In one embodiment, general purpose input/output translator 220 also includes a synchronization port 226 coupled to translation logic 228. The synchronization port 226 receives a synchronization signal 213 (e.g., a clock signal). The synchronization signal 213 controls the timing of output operations on the translated indication ports 221 through 225. The synchronization signal can also be utilized to provide an indication of the magnitude and or direction of a support operation change. In one exemplary implementation, a consolidated indication signal (e.g., 211) provides an indication of the direction of a change (e.g., a voltage level increase or decrease) and the synchronization signal (e.g., 213) provides an indication of the magnitude of the change (e.g., the number of increments in a value representing a control level change). In one exemplary implementation, the synchronization signal is a clock signal from processing unit 210. The synchronization signal can be set at a frequency significantly faster than the clock directing controller 240. In one embodiment, high speed clocking from processing unit 210 facilitates reduction of over head and time interference by control software in a multi-tasking system (e.g., a system in which BIOS and/or operating system multi-tasking operations are performed). In addition, a given task (e.g., change from a control level associated with translation indication port 221 to a control level associated with translation indication port 224) can be accomplished in a deterministic time frame.

It is appreciated that the translated indication signals can be utilized in association with a wide variety of functions. For example, the translated indication signals can indicate a voltage level for a power signal to a processor (e.g., processing unit 210). The translated indication signals can also indicate an operating voltage level or speed for a fan associated with cooling a processor or system. In addition, the translated indication signals can indicate a frequency level of a clock signal for a processor.

It is also appreciated that the translation logic 228 can have a variety of implementations. Translation logic 228 can be a state machine that changes states in accordance with directions indicated by consolidated indication signal 212. The states can be associated with different control level values and when the state machine enters a different state the consolidated indication ports 221 through 225 of GPIO translator 220 convey a different control level value. The translation logic 228 can be a counter for incrementing an initialized value associated with the initialization signal. The incremented value is communicated as a plurality of translated indication signals on the translated indication ports 221 through 225. The translation logic 228 can be programmable logic for performing the translation of the consolidated indication signals (e.g., consolidated indication signal 211).

In one embodiment of the present invention, general purpose input/output translator 220 is included in a computer system. The computer system includes processing unit 210, general purpose input/output translator 220, controller 240, and support component 250. General purpose input/output translator 220 is coupled to processing unit 210 and controller 240 which is coupled to support component 250.

The components of the computer system cooperatively operate to perform information processing and dynamically alter support functionality for processing unit 210. Processor 210 processes information. Support component 250 provides support for processor 210 operations. Controller 240 controls the operating support provided by support component 250. General purpose input/output translator 220 translates a multilevel indication single stream control signal (e.g., consolidated indication signal 211) received from processor 210 into a plurality of single level indication control signals (e.g., control level indication signals 231 through 235) and forwards the single level indication control signals to controller 240.

In one exemplary implementation, each single level indication control signal indicates a different level. In another implementation, the single level control signals collectively indicate a level. One logic value of the plurality of bits in a count value can be communicated as each single level indication control signal. For example, a least significant bit of a count value is communicated as control level indication signal 231 and the most significant bit of a count value is communicated as control level indication signal 235.

It is appreciated that the support component 250 can include a variety different types of support components. For example, support component 250 can be a power supply and the operating support includes providing power to processor 210. Controller 240 can be a switcher that directs switching of a voltage level of a power signal provided by support component 250 (in the present power supply implementation) to processor 210. Controller 240 switches the voltage level of the power signal based upon the single level indication control signals (e.g., control level indication signals 231 through 235) forwarded from general purpose input/output translator 220. Alternatively, support component 250 can be a fan that provides cooling for processing unit 210. Controller 240 can switch the cooling level of the fan based upon the single level indication control signals (e.g., control level indication signals 231 through 235) forwarded from general purpose input/output translator 200.

Figure 3:
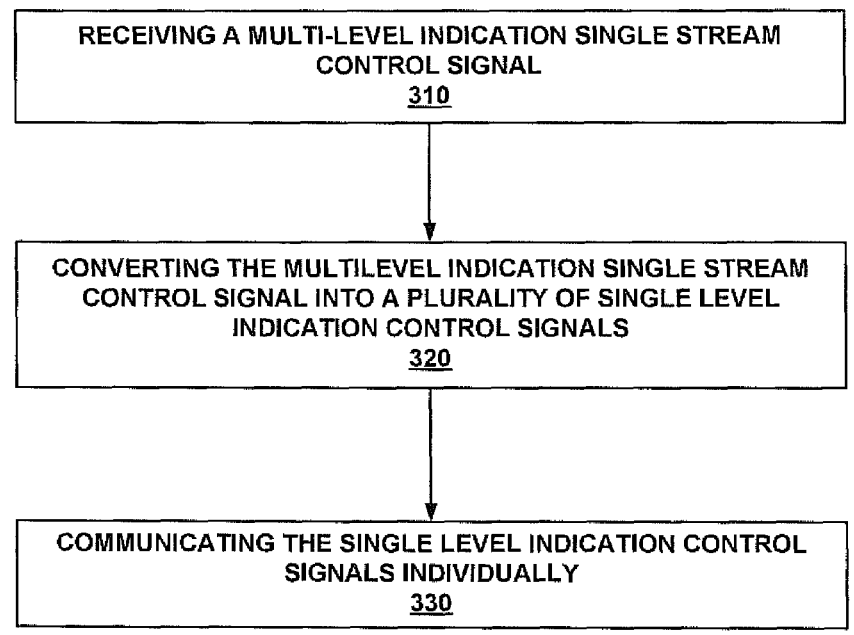
FIG. 3 is flow chart of a general purpose input/output conversion method in accordance with one embodiment of the present invention.

FIG. 3 is flow chart of a input/output conversion method, a input/output conversion method in accordance with one embodiment of the present invention. In the present implementation, the input/output conversion method is a general purpose input/output conversion method. General purpose input/output conversion method 300 enables a minimal number of general purpose input/output ports of a processor to interface with a significantly greater number of ports on a controller. In one embodiment, the processor is a graphics processing unit for performing graphics processing. For example, the processor processes information associated with a video game, rendering cinematic realistic images, etc.

It is appreciated that a present invention input/output conversion method can also be implemented a special function input/output conversion method. The special function input/output conversion method includes similar steps as general purpose input/output conversion method 300, except the steps involve converting a multi-level indication single stream control signal associated with a processor special function input/output operation. The special function input/output conversion method enables a minimal number of special function input/output ports of a processor to interface with a significantly greater number of ports on a controller.

In step 310, a multi-level indication single stream control signal associated with a processor general purpose input/output operation is received. The multi-level indication single stream control signal can include an indication to increase or decrease a count value. Alternatively, the multi-level indication single stream control signal can include a single stream bit sequence corresponding to a plurality stream multi-bit value. For example, the multi-level indication single stream control signal can include a single stream bit sequence that is converted to an input value for a programmable logic array. In one embodiment, an initial support level is set in accordance with an initial level indication (e.g., an initialization signal).

In step 320, the multilevel indication single stream control signal is converted into a plurality of single level indication control signals. In one embodiment of the present invention, the converting includes adjusting an initial support level in accordance with a multi-level indication single stream control signal. For example, converting can include incrementally changing (e.g., incrementing or decrementing) an initial level value by an amount indicated by the multi-level indication single stream control signal. In one exemplary implementation, the logical values of the plurality of single level indication control signals correspond to the logical values in a count value after the incremental changes (e.g., increments or decrements). In another exemplary implementation, the logical values of the plurality of single level indication control signals correspond to encoded or decoded values. The encoded and decoded values can correspond to a control level.

Each of the plurality of single level indication control signals are communicated individually in step 330 to a controller that controls operating conditions of the processor. For example, each of the plurality of single level indication control signals (e.g., control level indication signal 231 through 235) are communicated to different controller ports (e.g., control indication port 241 through 245) associated with a different level of control.

Figure 4:
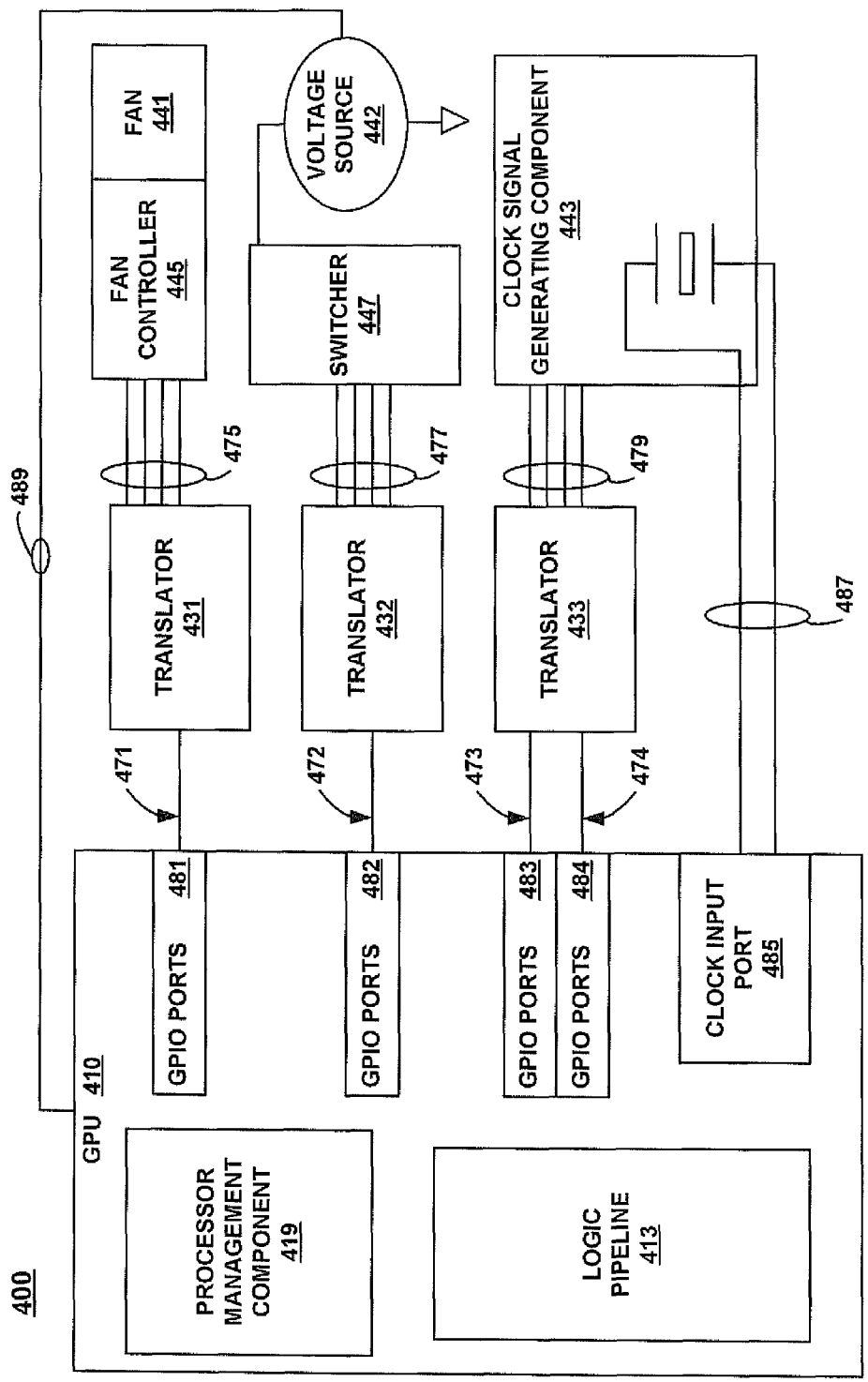
FIG. 4 is a block diagram of a processor adjustment system in which one embodiment of present invention general purpose input/output translator is included.

FIG. 4 is a block diagram of processor adjustment system 400 in which one embodiment of present invention general purpose input/output translators are included. Processor adjustment system 400 includes graphics processing unit (GPU) 410, general purpose input/output translators 431 through 433, clock signal generator 443, switcher 447, voltage source 442, (switcher 447 and voltage source 442 can be included in a single component), fan controller 445, and fan 441. It is appreciated that components in the present invention can be implemented in hardware, software, firmware and/or combinations thereof. It is also appreciated that the present invention can be readily implemented in conjunction with a variety of processors (e.g., a central processing unit, etc.) implemented in different types of systems (e.g., gaming consoles, personal computers, servers, network routers and switches etc.).

The components of graphics processor adjustment system 400 cooperatively operate to provide graphics processor performance adjustment. Graphics processing unit 410 performs processing tasks. Clock signal generating unit 443 generates a clock signal 487 for GPU 410. In one embodiment, clock signal generating unit 443 is included in GPU 410 (e.g., there is an external clock generator which is multiplied up by an internal programmable phase lock loop circuit). Voltage source unit 442 generates a power signal 489 for GPU 410 in accordance with direction (e.g., VID) to switcher 447. Fan 441 provides cooling air for GPU 410 in accordance with instructions from fan controller 445.

Graphics processing unit 410 includes processor management component 419, logic pipeline 413, general purpose input/output ports 481 through 484 and clock input port 485. Logic pipeline 413 performs graphics rendering (e.g., including geometry processing and pixel processing). Processor management component 419 controls the operating conditions of GPU 210. In one exemplary implementation, processor management component 419 selects a desired processor management objective for GPU 410. The present invention is readily adaptable to systems that have a variety of objectives, including maximum performance, conservation of reliability, temperature regulation, power conservation and/or noise abatement (e.g., quiet mode). An operating condition of a GPU 410 is analyzed. The results of the operating condition analysis are compared to operating conditions associated with the desired management objective. Processor management component 419 adjusts GPU 410 operating conditions according to the desired objectives by issuing consolidated indication signals 471 through 473 and synchronization signal 474 via GPIO ports 481 through 484 to GPIO translators 431 through 433. It is appreciated that present invention translators 431 and 432 can also receive a synchronization signal (e.g., 474 or another synchronization signal not shown) for controlling the timing of output on the plurality of single level indication control signals (e.g., control level indication signals 475, 477 (e.g., VID) and 479 respectively).

GPIO translators 431 through 433 are similar to GPIO translator 220. GPIO translators 431 through 433 translate respective multilevel indication single stream control signals (e.g., consolidated indication signals 471 through 473) received from GPU 410 into a plurality of single level indication control signals (e.g., control level indication signals 475 through 479 respectively). GPIO translators 431 through 433 forward the single level indication control signals to a controller (e.g., fan controller 445, switcher 447, a controller within clock signal generating component 443, respectively).

In one exemplary implementation, the power signal 489 voltage and the clock signal 487 frequency are increased for high performance tasks and reduced for low performance tasks of GPU 410.

It is appreciated the present invention is compatible with and can be included in a variety of processor adjustment systems and methods, including the systems and methods described in co-pending patent applications "A Processor Performance Adjustment System and Method" filed on Nov. 14, 2002 (U.S. patent Ser. No. 10/295,619) and "A Processor Temperature and Mode Adjustment System and Method" filed on Nov. 14, 2002 (U.S. patent Ser. No. 10/295, 748), which are hereby incorporated by reference.

Figure 5:
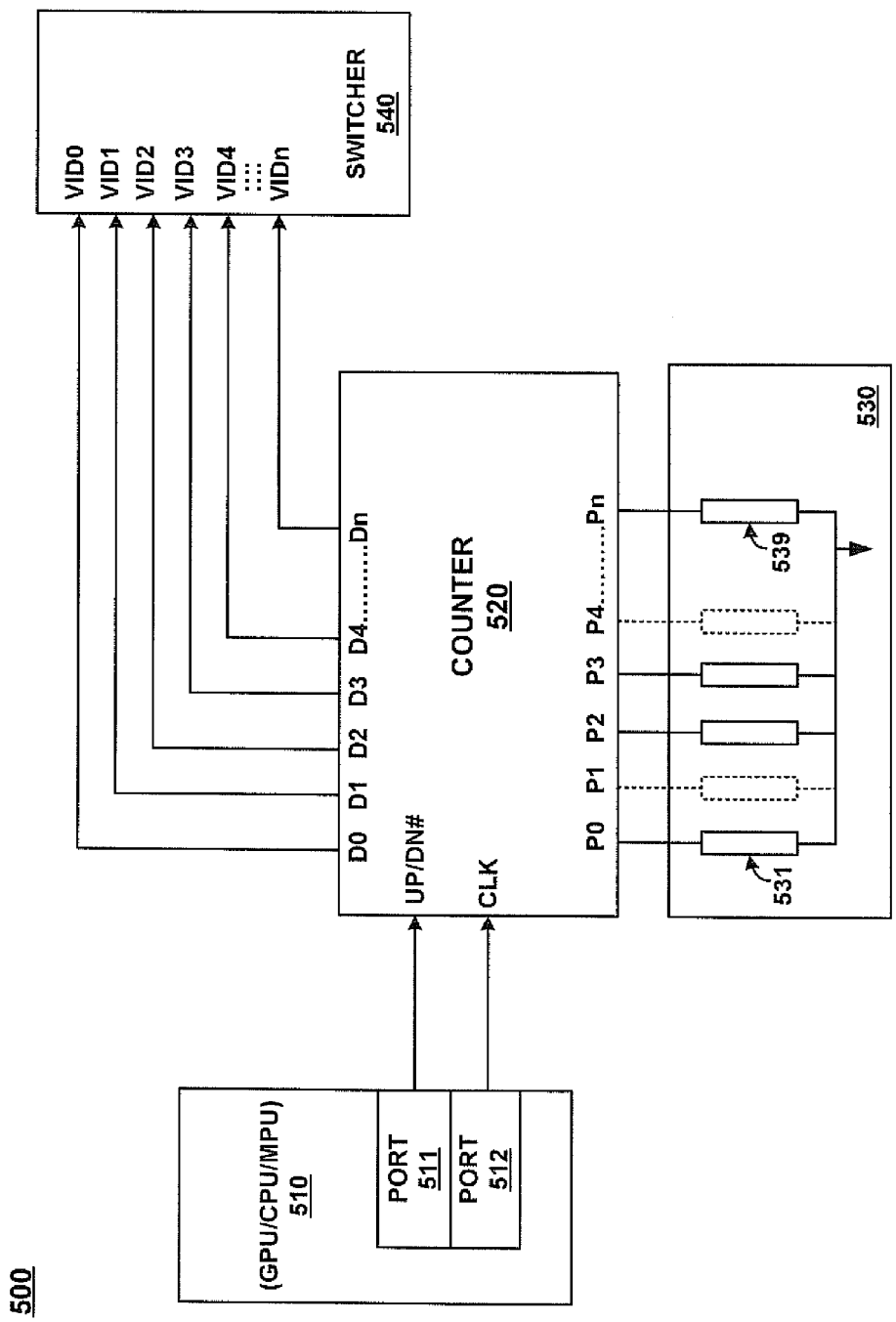
FIG. 5 is a block diagram of an exemplary present invention general purpose input/output translator implementation utilizing a counter.

FIG. 5 is a block diagram of computer system 500, one embodiment of a present invention general purpose input/output translator implementation utilizing a counter. Computer system 500 includes processor 510, counter 520, initialization component 530 and switcher 540 which provides an indication of an initial operation voltage level for processor 510. It is appreciated that the present invention is compatible with a variety of processors and processor 510 can be a central processing unit (CPU), graphics processing unit (CPU) and/or a math processing unit (MPU) and/or a Microcontroller unit (MCU). Processor 510 does not have dedicated VID select pins and has a two GPIO ports 511 and 512 for communicating voltage level indications to switcher 540. Switcher 540 has N (e.g., 2, 3, 4, 5 etc.) VID pins that permit control of the core voltage (e.g., VCC or VDD) for processor 510 on the fly. In one exemplary implementation, switcher 540 permits dynamic control of VID input levels. The translated indication signals (e.g., control level indication signals Do through Dn) set the operating voltage of switcher 540 (e.g., in a proportion as specified by the manufacturer using a VID table). The preset resistors (e.g., 531 through 539) included in initialization component 530 set or "program" counter 520 during system power on and ensure switcher 540 provides an initial predefined operating voltage.

When the processor 510 wants to change the switcher operating voltage, the processor sets the up/down pin of counter 520 by sending a signal via GPIO port 511. Setting the up/down pin determines whether counter 520 is going to increment or decrement, which in turn determines the direction of the change (e.g., increase or decrease) of the operating voltage instructions to switcher 540. Processor 510 then toggles the synchronization signal CLK via GPIO port 512 to change the output of counter 520.

Counter 520 output, translated indication signals (e.g., control level indication signals Do through Dn) can be a binary count of the clock from a preset value if an off the shelf binary counter is utilized. If the counter is implemented using a programmable logic (e.g., a PLA) the translated indication signals (e.g., control level indication signals Do through Dn) can be determined and programmed by a user. The initial value (e.g., power on reset value) of the translated indication signals (e.g., control level indication signals Do through Dn) can also be programmed, encoded or decoded. In one embodiment in which the initial value is programmed by an alternate manner (e.g., software programming), resistors 531 through 539 are not included in computer system 500

Figure 6:
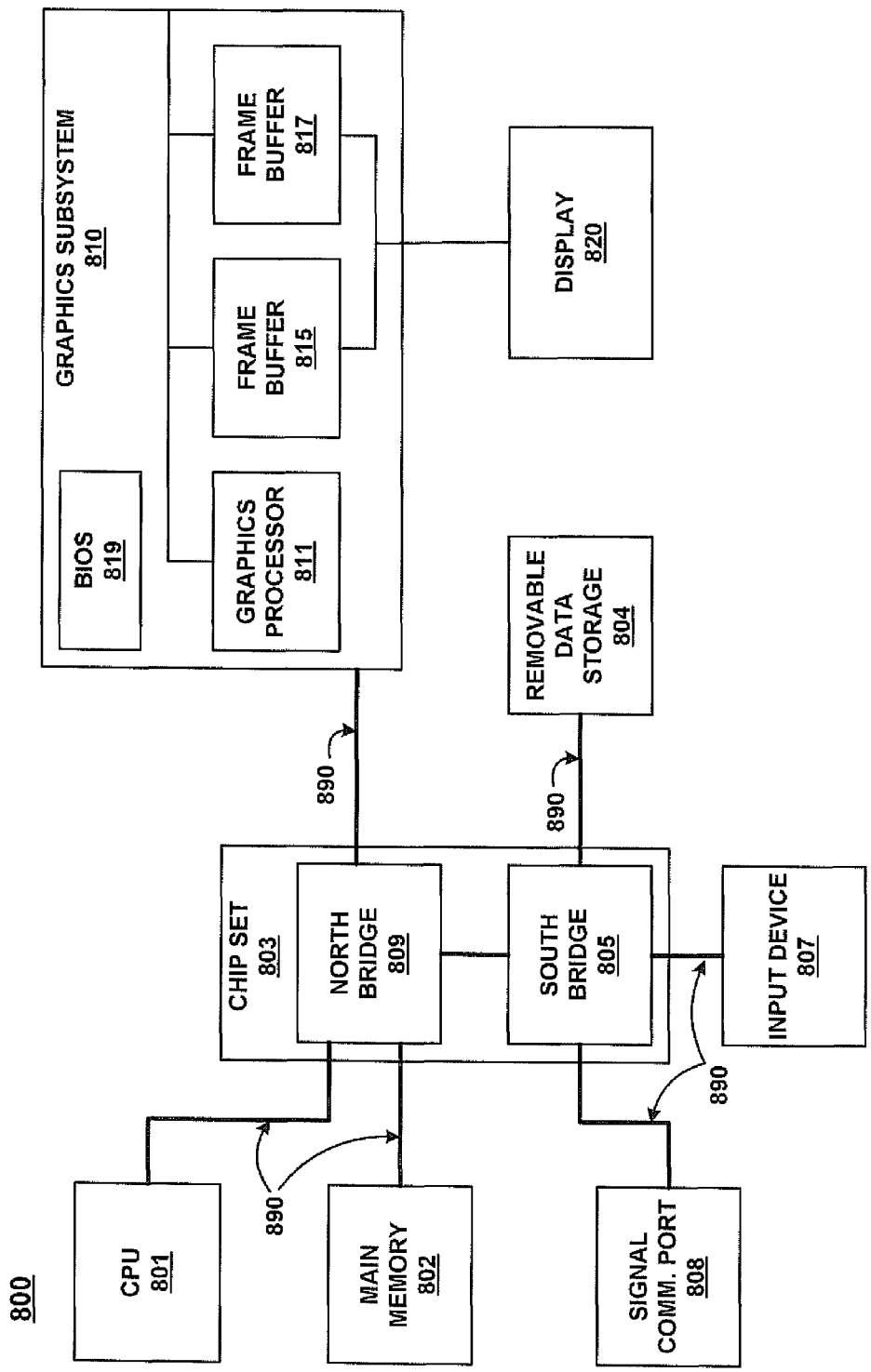
FIG. 6 is a block diagram of one embodiment of a computer system upon which the present invention can be implemented.

FIG. 6 is a block diagram of computer system 800, one embodiment of a computer system upon which the present invention can be implemented. Computer system 800 includes communication bus 890, central processor unit 801, main memory 802 (e.g., random access memory), chip set 803 with north bridge 809 and south bridge 805, removable data storage device 804, input device 807, signal communications port 808, and graphics subsystem 810 which is coupled to display 820. Communication bus 890 couples chipset 803 to central processor unit 801, main memory 802, removable data storage device 804, input device 807, signal communications port 808 and graphics subsystem 810. Graphics subsystem 810 includes graphics processor 811, BIOS 819 and graphics buffers 815 and 817. In one embodiment of the present invention, graphics processor 811 is included in north bridge 809. In one embodiment, present invention translations are utilized to control operations associated with central processing unit 801 and graphics processing unit 811.

The components of computer system 800 cooperatively function to provide a variety of functions, including processing of graphics information in an efficient power conservation manner. Communications bus 890 communicates information, central processor 801 processes information and engages processor operating condition adjustments, main memory 802 stores information and instructions for the central processor 801. Removable data storage device 804 also stores information and instructions (e.g., functioning as a large information reservoir). Input device 806 provides a mechanism for inputting information and/or for pointing to or highlighting information on display 820. Signal communication port 808 provides a communication interface to exterior devices (e.g., an interface with a network). Display device 820 displays information in accordance with data stored in graphics buffers 815 and 817. Graphics processor 811 processes graphics commands from central processor 801 and provides the resulting data to graphics buffers 815 and 817 for storage and retrieval by 811 to display on monitor 820. Graphics processor 811 also engages in present invention processor operating condition adjustments. In one embodiment of the present invention, graphics subsystem 810 is supplemental power hot plugable and the system generates interrupts that can automatically slow down or speed up the graphic processor 811 if a power connector (e.g., an extra power from a hard disk connector) is coupled or uncoupled to graphics subsystem 810.

Thus, a present invention flexible general purpose input/output translator facilitates flexible dynamic processor support operation changes on the fly using a minimal number of GPIO pins. The present invention does not consume a significant number of precious chip pin resources to achieve a significant level of flexibility and fine granularity when interfacing with processor support operations. A coarse level change can go through fine steps permitting the processor voltages to be changed at much wider increment levels without upsetting the system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A general purpose input/output translator comprising:
   a consolidated indication port for receiving a consolidated indication signal from a general purpose input/output port of a processor wherein said consolidated indication signal is an indication of the direction of a change; a synchronization port for receiving a synchronization signal, wherein said synchronization signal is an indication of the magnitude of the change;
   translation logic for translating said consolidated indication signal into a plurality of translated indication signals, wherein each of said plurality of translated indication signals indicate a different support setting, said translation logic coupled to said consolidated indication port;
   a plurality of translated indication ports for respectively communicating a different one of said plurality of translated indication signals to a controller that controls operating support for said processor, said plurality of translated indication ports coupled to said translation component; and
   an initialization port for receiving an initialization signal, said initialization port coupled to said translation component.

2. A general purpose input/output translator of claim 1 wherein said translated indication signals indicate a voltage level for a power signal to said processor.

3. A general purpose input/output translator of claim 1 wherein said translated indication signals indicate an operating level for a fan associated with cooling said processor.

4. A general purpose input/output translator of claim 1 wherein said translation logic includes a counter component for incrementally changing an initialized value associated with said initialization signal and an incremented or decremented value is communicated as a plurality of translated indication signals on said plurality of translated indication ports.

5. A general purpose input/output translator of claim 1 wherein said translation logic includes a programmable logic array for performing said translating of said consolidated indication signals.

6. A general purpose input/output translator of claim 1 wherein said translated indication signals indicate a frequency level of a clock signal for said processor.

7. A general purpose input/output conversion method comprising:
   receiving a multi-level indication single stream control signal associated with a processor general purpose input/output operation;
   converting said multilevel indication single stream control signal into a plurality of single level indication control signals, wherein each of said plurality of single level indication control signals indicate a different support setting; and
   communicating individually from respective ports each of said plurality of single level indication control signals to a controller that controls operating conditions of said processor.

8. A general purpose input/output conversion method of claim 7 further comprising setting an initial support level in accordance with an initial level indication.

9. A general purpose input/output conversion method of claim 8 wherein said converting comprises adjusting said initial support level in accordance with said multi-level indication single stream control signal.

10. A general purpose input/output conversion method of claim 7 wherein said converting comprises incrementing an initial level value by an amount indicated by said multi-level indication single stream control signal and a synchronization signal.

11. A general purpose input/output conversion method of claim 7 wherein logical values of said plurality of single level indication control signals correspond to a count value in which the least significant bit of the count is communicated as one control level indication and the most significant bit of the count is communicated as another control level indication.

12. A computer system comprising:
a processor for processing information;
a general purpose input/output translator for translating a multilevel indication single stream control signal received from said processor into a plurality of single level indication control signals that are respectively output from different ports of the general purpose input/output translator wherein said multi-level indication single stream control signal includes an indication of the direction of a change and an indication of the magnitude of the change, wherein each of said plurality of single level indication signals indicate a different support setting, said general purpose input/output translator coupled to said processor;
a controller for controlling operating support to said processor based upon said plurality of single level indication control signals, said controller coupled to said general purpose input/output translator; and
a support component for supporting operations of said processor, said support component coupled to said controller.

13. A computer system of claim 12 wherein said general purpose input/output translator includes a counter circuit that increment a count value in accordance with said multilevel indication single stream control signal and a synchronization signal.

14. A computer system of claim 12 wherein said general purpose input/output translator includes a programmable logic unit.

15. A computer system of claim 12 wherein said support component is a power supply and said operating support includes providing power to said processor.

16. A computer system of claim 15 wherein said controller includes a switcher that directs switching of a voltage level of a power signal provided by said power supply to said processor, said switcher switches said voltage level of said power signal based upon said plurality of single level indication control signals forwarded from said general purpose input/output translator.

17. A computer system of claim 12 wherein said support component is a fan and said operating support includes providing cooling.

18. A computer system comprising of claim 12 wherein said processor is a graphics processing unit for performing graphics processing.

19. A computer system comprising of claim 12 wherein said processor processes information associated with a video game.

20. An input/output translator comprising:
a consolidated indication port for receiving a consolidated indication signal from an input/output port of a processor wherein said consolidated indication signal is an indication of the direction of a change; a synchronization port for receiving a synchronization signal, wherein said synchronization signal is an indication of the magnitude of the change;
translation logic for translating said consolidated indication signal into a plurality of translated indication signals, wherein each of said plurality of translated indication signals indicate a different support setting, said translation logic coupled to said consolidated indication port; and
a plurality of translated indication ports for communicating a respective one of said plurality of translated indication signals to a controller that controls operating support for said processor, said plurality of translated indication ports coupled to said translation component.

21. An input/output translator of claim 20 further comprising an initialization port for receiving an initialization signal that indicates an initial control level, said initialization port coupled to said translation component.

22. An input/output translator of claim 20 wherein said translated indication signals indicate a voltage level for a power signal to said processor.

23. An input/output translator of claim 20 wherein said input/output port is a general purpose input/output port.

24. An input/output translator of claim 20 wherein said input/output port is a special function input/output port.

25. A special function input/output conversion method comprising:
receiving a multi-level indication single stream control signal associated with a processor special function input/output operation wherein said multi-level indication single stream control signal includes an indication of the direction of a change and an indication of the magnitude of the change;
converting said multilevel indication single stream control signal into a plurality of single level indication control signals wherein each of said plurality of single level indication control signals indicate a different support setting; and
communicating individually from respective ports each of said plurality of single level indication control signals to a controller that controls operating conditions of said processor.

26. A general purpose input/output conversion method of claim 25 wherein said converting comprises adjusting an initial support level in accordance with said multi-level indication single stream control signal.

27. A general purpose input/output conversion method of claim 25 wherein said converting comprises incrementing an initial level value by an amount indicated by said multi-level indication single stream control signal and a synchronization signal.

* * * * *